United States Patent
Salmon-Legagneur et al.

(10) Patent No.: US 9,904,526 B2
(45) Date of Patent: Feb. 27, 2018

(54) CONTROL FLOW GRAPH FLATTENING DEVICE AND METHOD

(71) Applicant: THOMSON LICENSING, Issy les Moulineaux (FR)

(72) Inventors: Charles Salmon-Legagneur, Rennes (FR); Antoine Monsifrot, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 173 days.

(21) Appl. No.: 14/922,151

(22) Filed: Oct. 24, 2015

(65) Prior Publication Data

US 2016/0117155 A1 Apr. 28, 2016

(30) Foreign Application Priority Data

Oct. 24, 2014 (EP) .................................... 14306694

(51) Int. Cl.
*G06F 9/45* (2006.01)
*G06F 21/12* (2013.01)
*G06F 21/14* (2013.01)

(52) U.S. Cl.
CPC .............. *G06F 8/443* (2013.01); *G06F 8/433* (2013.01); *G06F 21/125* (2013.01); *G06F 21/14* (2013.01)

(58) Field of Classification Search
CPC ............................... G06F 8/443; G06F 21/125
USPC .................................................. 717/156, 155
See application file for complete search history.

(56) References Cited

U.S. PATENT DOCUMENTS

| 6,779,114 B1 * | 8/2004 | Chow .................... G06F 21/14 713/189 |
| 6,842,862 B2 | 1/2005 | Chow et al. |
| 7,350,085 B2 | 3/2008 | Johnson et al. |
| 7,797,691 B2 | 9/2010 | Cockx et al. |

(Continued)

OTHER PUBLICATIONS

Hui Fang et al., "Multi-stage Binary Code Obfuscation Using Improved Virtual Machine", 2011, pp. 168-181.*

(Continued)

*Primary Examiner* — Wei Zhen
*Assistant Examiner* — Lanny Ung
(74) *Attorney, Agent, or Firm* — Myers Wolin LLC

(57) ABSTRACT

Control Flow Graph flattening of a function comprising a plurality of basic blocks having an address and at least one instruction. A processor creates a jump table associating a label of each basic block with its address, creates a coefficient array comprising constant coefficients, creates a dispatcher basic block comprising instructions to look up an address in the jump table and to jump to the address, replaces a Jump terminal instruction by a jump to the dispatcher basic block in each basic block, creates and inserts at least one lookup functions in each of the plurality of basic blocks, each lookup function returning a derived value based on a constant coefficient depending on at least an index of the basic block; creates and inserts a first branch function calculating the label of a subsequent basic block based on at least the derived value and a second branch function calculating the index of the subsequent basic block; and creates and inserts into the dispatcher basic block a transition function obtaining the address in the jump table based on at least the label of a subsequent basic block.

15 Claims, 4 Drawing Sheets

(56) References Cited

U.S. PATENT DOCUMENTS

| | | | |
|---|---|---|---|
| 7,886,280 B2* | 2/2011 | Zawawy | G06F 9/4436 717/128 |
| 7,949,511 B2 | 5/2011 | Ganai | |
| 8,756,435 B2 | 6/2014 | Lerouge et al. | |
| 2013/0232323 A1* | 9/2013 | Lerouge | G06F 21/14 712/233 |

OTHER PUBLICATIONS

T. Laszlo et al., "Obfuscating C++ programs via control flow flattening", 2009, pp. 3-19.*

Song Ya-qi et al., "Experiment with control code obfusctation", Aug. 2007, Journal of Communication and Computer, pp. 59-62.*

Chenxi Wang et al., "Software Tamper Resistance: Obstructing Static Analysis of Programs", 2000, pp. 1-18.*

Balachandran etal: "Software Code Obfuscation by Hiding Control Flow Information in Stack"; Information Forensics and Security (WIFS), 2011 IEEE International Workshop on, Nov. 29, 2011-Dec. 2, 2011, pp. 1-6.

Barak et al: "On the Impossibility of Obfuscating Programs"; In Advances in Cryptology CRYPTO 2001, Aug. 16, 2001, pp. 1-18.

Cappaert: "Code Obfuscation Techniques for Software Protection"; Phd. Thesis, Katholieke Universiteit Leuven, Apr. 2012, http://www. cosic. esat. kuleuven.be/publications/thesis-199. pdf; pp. 1-132.

Cappaert etal: "General Model for Hiding Control Flow"; Proceedings of the tenth annual ACM workshop on Digital rights management, 2010, pp. 35-42.

Chow etal: "An approach to the obfuscation of control-flow of sequential computer programs"; In Information Security, 2001, pp. 144-155. Springer.

Collberg etal: "A Taxonomy of obfuscating transformations"; Technical report, Department of Computer Science, The University of Auckland, New Zealand, 1997; pp. 1-36.

Courousse etal : "COGITO: code polymorphism to secure devices"; In SECRYPT 2014—Proceedings of the 11th International Conference on Security and Cryptography, Aug. 28-30, 2014, pp. 451-456.

Ferraris: "Call-graph flattening transform for LLVM 2.8"; https://github.com/CAFxX/cgfAuthored on Aug. 2, 2011; pp. 1-2.

Gueguen etal: "Design and Automatic Evaluation of Control Flow Obfuscators in a Dynamic Attack Context", 2014; pp. 1-2.

Korobeynikov: "Improving Switch Lowering for The LLVM Compiler System"; In Proceedings of the Spring/Summer Young Researchers O Colloquium on Software Engineering, May 2007, No. 1; pp. 1-5.

Laszlo: "Obfuscating C plus plus programs via control flow flattening"; Annales Universitatis Scientarum Budapestinensis de Rolando Etovos Nominatae, Sectio Computatorica, 2009, 30:pp. 3-19.

Madou: "Loco: An interactive code (de) obfuscation tool"; In Proceedings of the 2006 ACM SIGPLAN symposium on Partial evaluation and semantics-based program manipulation. ACMJan. 10, 2006, pp. 140-144.

Ramalingam: "The Undecidability of Aliasing"; ACM Trans. Program. Lang. Syst.Sep. 1994., 16(5):pp. 1467-1471.

Saylea: "Superoptimizer analysis of multiway branch code generation"; In GCC Developers O Summit, 2008, vol. 103; pp. 1-16.

Udupa etal: "Deobfuscation: Reverse engineering obfuscated code"; In Reverse Engineering, 12th Working Conference on, Nov. 7-11, 2005, pp. 1-10; IEEE.

Venderbeken: "Mise a plat de graphes de flot decontrole et execution symbolique"; SSTIC, 2013; pp. 1-18.

Wang: "A Security Architecture for Survivability Mechanisms"; PhD Thesis, University of Virginia, 2001; pp. 1-209.

Wang etal: "Protection of Software-based Survivability Mechanisms"; In Dependable Systems and Networks, 2001. DSN 2001. International Conference on, pp. 193-202. IEEE, 2001.

Wang etal: "Software tamper resistance: Obstructing static analysis of programs"; Technical report, Technical Report CS-2000-12, Dec. 2000; pp. 1-18.

Ge etal: "Control flow based obfuscation"; In Proceedings of the 5th ACM workshop on Digital rights management, ACM, 2005, pp. 83-92.

Lattner etal: "The LLVM Compiler Framework and Infrastructure Tutorial"; In Languages and Compilers for High Performance Computing, 2005, pp. 15-16, Springer.

Souchet: "Obfuscation of steel: meet my Kryptonite"; Jul. 6, 2013; pp. 1-24.

Junod: "LLVM and Code Obfuscation"; Technical report, Universite Catholique de Louvain, Belgium, Jun. 26, 2013; pp. 1-67.

Aucsmith: "Tamper resistant software: An implementation"; Information Hiding, vol. 1174 of Lecture Notes in Computer Science, pp. 317-333. Springer, Jun. 1996.

Junod et al: "Obfuscator reloaded"; Application security forum 2012—slides 1-47; Nov. 7, 2012.

Cytron etal: "Efficiently computing static single assignment form and the control dependence graph"; ACM Transactions on Programming Languages and Systems (TOPLAS), 13(4): pp. 451-490, Oct. 1991.

Omar etal: "Arbitrary control-flow embedding into multiple threads for obfuscation: a preliminary complexity and performance analysis"; Proceedings of the 2nd international workshop on Security in cloud computing, pp. 51-58. Jun. 3, 2014.

Search Report dated Apr. 17, 2015.

Chen et al., "Confuse: LLVM-based Code Obfuscation", May 16, 2013, pp. 1-14, plus cover page.

* cited by examiner

```
int f(int i, int j)
{
  int a = 0;
  if (i < j) {
    a = j;
  }
  else
    do {
      a *= i--;
    } while (i > 0);

return a;
}
```

CONTROL FLOW GRAPH FLATTENING DEVICE AND METHOD

This application claims the benefit, under 35 U.S.C. § 119 of European Patent Application No. 14306694.2, filed Oct. 24, 2014.

TECHNICAL FIELD

The present principles relate generally to computer systems and in particular to Control Flow Graph (CFG) flattening.

BACKGROUND

This section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Control flow graph (CFG) flattening is a software obfuscation technique used to make reverse engineering of a function difficult. The initial CFG of a function, made of basic blocks (BB) and jumps between them, is transformed to a functionally equivalent flattened graph. In the flattened graph, a central basic block, the dispatcher (D), leads to all other BBs, which all call back to the dispatcher. Wang first described this technique in a PhD thesis "A Security Architecture for Survivable Systems", Department of Computer Science, University of Virginia, and in C. Wang, J. Davidson, J. Hill & J. Knight, "Protection of software-based survivability mechanisms". In *Dependable Systems and Networks* 2001, *DSN* 2001, *International Conference on*. IEEE.

FIG. 1 illustrates an exemplary function f and its corresponding CFG comprising four BBs, A-D. FIG. 2 illustrates a flattened CFG corresponding to the CFG in FIG. 1. It can be seen that the dispatcher executes a switch function S between the execution of BBs.

The control flow during execution is dependent on a dispatcher variable X. This variable is instantiated locally to a label $X_i$ in each basic block $BB_i$. At runtime, each basic block $BB_i$ assigns a new label $X_{i+1}$ thereby indicating which next basic block to execute next. A switch block then uses the dispatcher variable X to jump indirectly, via a jump table, to the intended successive basic block.

Every basic block $BB_i$ embeds instructions to compute label $X_{i+1}$ from label $X_i$. Caeppaert calls this a Branch function [see J. Cappaert, A General Model for Hiding Control Flow, Proceedings of the tenth annual ACM workshop on DRM, ACM 2010]. In this description the branch function is denoted $B_i(X_i)$.

As an example, in basic block A, the statement {x=i<j? 1:2} can be expressed generally as the result of a Branch function $B_A(\ ):B_A(X_A)=$BooleanFunction(inputs)*a+b. More particularly, $B_A(X_A)=(i<j?)*1+(i>=j?)*2$. (i<j?) is a Boolean function that returns 1 or 0, so $B_A(\ )$ returns 1 or 2 depending on the inputs, i and j. A branch function can be generalized to any conditional statement having more than two term conditions.

The dispatcher uses another function, the transition function F( ). In FIG. 2, this function is responsible for converting the dispatcher variable $X_i$, to an address $PA_i$ of the next BB to execute. When flattening a CFG at source code level (e.g. for a program in C language), the transition function F( ) may be implicit. For example, the switch case in the dispatcher is converted to a sequence of instructions by the compiler. However, when flattening the CFG for a low level assembly language (e.g. X86), the transition function normally has to be written expressly.

FIG. 3 illustrates a generic sequence diagram for a flattened CFG. A basic block $BB_i$ comprises two parts: a first part 30 executed upon entry to the BB and a second part 32 that is executed before leaving the BB. The second part 32 calculates the next label $X_{i+1}$ that is used by a dispatcher 34 to compute the address of the next BB and then jumps to this address. The bold border of the first part 30 indicates that this part is part of the original, non-flattened, CFG.

Basic implementations of flattened CFGs are vulnerable to static analysis attacks. By analysing each basic block and the constants used by the branch function B( ), an attacker is able to gain knowledge of dependencies between basic blocks, and then rebuild the original CFG. For example, in block 1 in FIG. 2, the conditional statement (x=i<j? 1:2) permits to deduce a relation between basic block A and basic blocks B and C.

A more generalized technique proposed by Cappaert in the previously mentioned paper consists in expressing the label $X_{i+1}$ relatively to the label $X_i$: $B_i(X_{i+1})=+a_i$*BooleanFunction(inputs)+$b_i$. The meaning of $(a_i,b_i)$ has slightly evolved, it no longer directly expresses a label value, but relative differences between labels. However, Cappaert observes that this representation is still vulnerable to local analysis. The differences between labels restrict the set of possibilities for $X_i$, and thus leak information to the attacker, making brute force attacks feasible.

More specifically, the attacker has access to the code of the transition function, and thus knows the correspondence between labels $X_i$ and addresses $PA_i$ of the basic blocks. To deduce the label of a basic block is straightforward: the attacker just has to compare the current address of the basic block and the information in the dispatcher. So for a given BBi, the attacker can guess what the current label X is, and then propagate the constant values $(a_i,b_i)$ backward and forward to deduce the predecessor and the successor of each basic block.

It can thus be seen that the existence of a logical inference chain between embedded constants in the branch function, the logical labels, and the address of the basic block causes a problem. Existing protections find a way of breaking this chain of logical inferences.

A first solution was proposed by Wang in the previously mentioned PhD thesis. The solution focuses on the obfuscation of the embedded constants. These are not changed, but simply expressed in term of formulae, using a global array. For this purpose Wang defines a global array g_array, containing fakes values and valid values. If, for example, g_array[10]=1 and g_array[20]=1, then the constant $C_i$=2 can be expressed by mathematical operation on elements of the array: $C_i$=(g_array[10]+g_array[20]) mod N. However, the solution is hardly more robust as the array is static and constant. By obtaining access to the array through reverse engineering, an attacker can resolve the different formulae.

To counter this attack, Wang further proposes to periodically reshuffle and redistribute the content of g_array using a redistribution function that is invoked outside of the flattened function. Ideally, this solution could be secure if the redistribution is not done externally, but internally in the flattened function during transition between basic blocks.

However, Wang does not give any clues on how to achieve this. Moreover, there is a further difficulty. In a graph, multiple paths can lead to the same basic block. If for example both basic blocks A and B lead to C, then the content of the array is not deterministic in C.

A second solution was proposed by Jung Ge et al. [See Jung Ge, Soma Chaudhuri, Akhilesh Tyagi: Control Flow Based Obfuscation. In Proceedings of DRM 05, the 5$^{th}$ ACM Workshop on Digital Rights Management]. According to this solution called CFI-hiding scheme, based upon Aucsmith's algorithm, sets of basic blocks are shuffled, XORed together, and dynamically deciphered at execution by a monitoring process called Self-modifying scheme. At any time the only set of basic block that is in clear text is the one that is already executed. [See D. Aucsmith: Tamper Resistant Software: An Implementation. In R. J. Anderson, editor, Information Hiding, volume 1174 of Lecture Notes in Computer Science].

A third solution was provided by Apple in patent application US 2013/0232323 that describes a solution that obfuscates the control flow in a different way. All calls are replaced by indirect jumps using a jump table. The basic blocks are not encrypted, but the jump table is; only a portion of the jump table is in the clear at a given time.

A common drawback with self-modifying schemes like the one by Jung Ge et al. is that the program requires write permission on itself. Such protection techniques are sometimes not allowed on some application platforms, like the iOS appstore, for which these techniques are assimilated to polymorphic viruses. Thus a protected application would not pass the security verifiers in charge of verifying the safety of the application before publishing it. Another problem with self-modifying techniques is their vulnerability to replay attacks. The randomization induced by the protection can be overcome if the attacker has means to restart execution from a backup initial state.

A fourth solution was provided by Cappaert in the previously mentioned paper. The solution uses a one-way function, typically a hash function applied on label values $X_i$ when entering the dispatcher. The resulting value is then matched against a series of if . . . then clauses to determine the next address.

By static analysis of the dispatcher in depth, an attacker obtains knowledge of all the possible images of label values by the hash function and of all address referenced. But as the hash function is not invertible, the antecedent label values cannot be obtained with certainty. By coding the label values with enough bits (for example a 128-bit random number), the input domain of the hash function cannot be enumerated by brute force. The attacker then cannot predict which antecedent $X_i$ label values leads to a given $Z_i$ value, and, thus, the corresponding antecedent address values.

It will be appreciated that this stops logical backward inference and makes forward inference more complex. In other words, the attacker cannot statically predict the predecessor of a basic block, and the constants used in the branching function have only a meaning for logical labels, and do not express indirectly constraints to basic block addresses. Hence, differences values between labels are no longer exploitable.

Unfortunately, while this solution provides good security, it has a serious drawback in terms of performance. The drawback stems from the Dispatcher. In practice, the compiler replaces the dispatcher's switch statement by a cascade of if . . . else condition statements. Given a CFG that has N basic blocks, the switch case will result in the cascade of N more conditional statements, so N more conditional basic blocks. A first consequence is that the number of total basic blocks in the CFG is multiplied by two (twice more times jump instructions). A second consequence is that each time the processor executes the dispatcher, it faces a cascade of N conditional statements, which results in the cost of potentially 2*N additional instructions. Moreover, this technique adds many comparisons and jump instructions to the execution, and also stresses the branch prediction much. For each missed branch prediction the processor started to execute instructions that then are not executed and the processor then has to 'undo' everything before continuing execution at the right address.

According to experiments, when using a flattened CFG based upon switch case, execution time appears proportional to the square of the number of basic blocks ($O(n^2)$). The time penalty is so great for large functions that it is difficult to envisage the solution to protect a major part of the protected binary. As a result, to keep a good execution performance, the coverage of the protection has to be limited to only some sensitive portions of the code, which naturally decreases the security. The poor performance result is a direct consequence of the selected hash function; the output of such functions are discontinuous values that cannot be mapped directly to an indexed table.

It will thus be appreciated that there is a need for a CFG flattening solution addresses these problems. The present principles can provide such a solution.

SUMMARY

In a first aspect, the principles are directed to a method for control flow graph flattening of a function of software code, the function comprising a plurality of basic blocks each having an address and at least one instruction, the method, performed by a processor of a device, comprising inserting a jump table associating a label of each basic block with the address of the basic block; inserting a coefficient array comprising constant coefficients for each of the plurality of basic blocks; inserting a dispatcher basic block comprising instructions to look up an address in the jump table and to jump to the address; replacing a jump terminal instruction by a jump to the dispatcher basic block in each of the plurality of basic blocks; inserting at least one lookup function in each of the plurality of basic blocks, each lookup function returning, depending on at least an index of the basic block, a derived value based on a constant coefficient from the coefficient array, each constant coefficient; inserting a first branch function and a second branch function, wherein the first branch function calculates the label of a subsequent basic block based on at least the derived value and the label of the present basic block, and wherein the second branch function calculates the index of the subsequent basic block based on the index of the present basic block; and inserting a transition function into the dispatcher basic block, the transition function obtaining the address in the jump table based on at least the label of a subsequent basic block.

Embodiments of the first aspect comprise:
that dummy values are included in the coefficient array;
that the transition function obtains the address in the jump table based on also the index of the subsequent basic block;
giving a value to the label of each of the plurality of basic blocks;
giving a value to the index of each of the plurality of basic blocks;
calculating changes for the labels and the indices that will result from transitions between the plurality of basic blocks, the changes corresponding to modifications made to the labels by the first branch function and to the indices by the second branch function;

calculating coefficients for each of the plurality of basic blocks.

In a second aspect, the principles are directed to a device for for control flow graph flattening of a function of software code, the function comprising a plurality of basic blocks each having an address and at least one instruction, the device comprising a hardware processor configured to create a jump table associating a label of each basic block with the address of the basic block; create a coefficient array comprising constant coefficients for each of the plurality of basic blocks; create a dispatcher basic block comprising instructions to look up an address in the jump table and to jump to the address; replace a jump terminal instruction by a jump to the dispatcher basic block in each of the plurality of basic blocks; create and insert at least one lookup function in each of the plurality of basic blocks, each lookup function returning, depending on at least an index of the basic block, a derived value based on a constant coefficient from the coefficient array, each constant coefficient; create and insert a first branch function and a second branch function, the first branch function calculating the label of a subsequent basic block based on at least the derived value and the label of the present basic block, and the second branch function calculating the index of the subsequent basic block based on the index of the present basic block; and create and insert a transition function into the dispatcher basic block, the transition function obtaining the address in the jump table based on at least the label of a subsequent basic block; and an interface configured to output the function after control flow graph flattening.

Embodiments of the second aspect comprise:

that the processor is configured to include dummy values in the coefficient array;

that the processor is further configured to make the transition function obtain the address in the jump table based on also the index of the subsequent basic block;

that the processor is further configured to give a value to the label of each of the plurality of basic blocks;

that the processor is further configured to give a value to the index of each of the plurality of basic blocks;

that the processor is further configured to changes for the labels and the indices that will result from transitions between the plurality of basic blocks, the changes corresponding to modifications made to the labels by the first branch function and to the indices by the second branch function.

BRIEF DESCRIPTION OF DRAWINGS

Preferred features of the present principles will now be described, by way of non-limiting example, with reference to the accompanying drawings, in which.

DESCRIPTION OF EMBODIMENTS

In its current implementation, Wang's solution does not resist well against static analysis and leak of information. The constant coefficients used in every branch function of each BB should not be predictable by static analysis, so they should not be assigned constant values, even obfuscated from outside call sites. One aspect of the present principles is to overcome limitations of Wang's solution by providing a stronger obfuscation of the location and the access to the constant coefficients. As will be seen in detail, the present solution computes locally in a basic block the constant coefficients in dependence on live variable P that is used in addition to the dispatcher live variable X.

At the same time, simply basing the assignment of the coefficients upon a live variable P raises another important technical problem. Local assignments of the live variable P in different basic blocks should be done in such a way that multiple execution paths leading to a given basic block does not lead to inconsistencies where the value of the live variable is not predictable.

According to the present principles, in order to resist to local static analysis, all branching computations performed done in a basic block (BB) do not depend exclusively on constant coefficients, whether these are defined inside or outside the BB. Instead, the constant coefficients are regrouped and shuffled into one large global array g_coeffs[ ], preferably stubbed with fake values and addressed indirectly through live variables.

The present principles thus rely on the use of two live variables, X and P, instantiated randomly at compilation time for each BB of the code to be protected; the variables for $BB_i$ are respectively denoted $X_i$ and $P_i$. The variables are:
  a current logical label $X_i$ in the range $\{1 \ldots n\}$, where n is the number of BBs of the code to protect; and
  a current parameter index $P_i$ in the range $\{0 \ldots m\}$. This variable gives a seek position in the g_coeffs array. Since the reading of the coefficients depends on a variable that can be essentially random and thus not predictable, static analysis cannot distinguish real coefficients from fake coefficients, nor for which basic block they are referenced.

It is assumed that $X_0$ and $P_0$ are retrieved securely or passed as parameters in any suitable prior art manner; how this is done is beyond the scope of the present principles.

Figure 1:
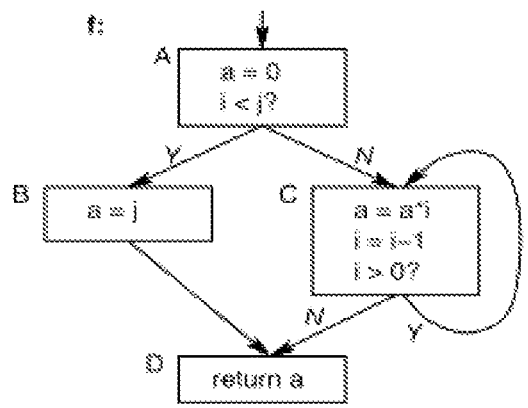
FIG. 1 illustrates an exemplary function and its corresponding CFG.
Figure 2:
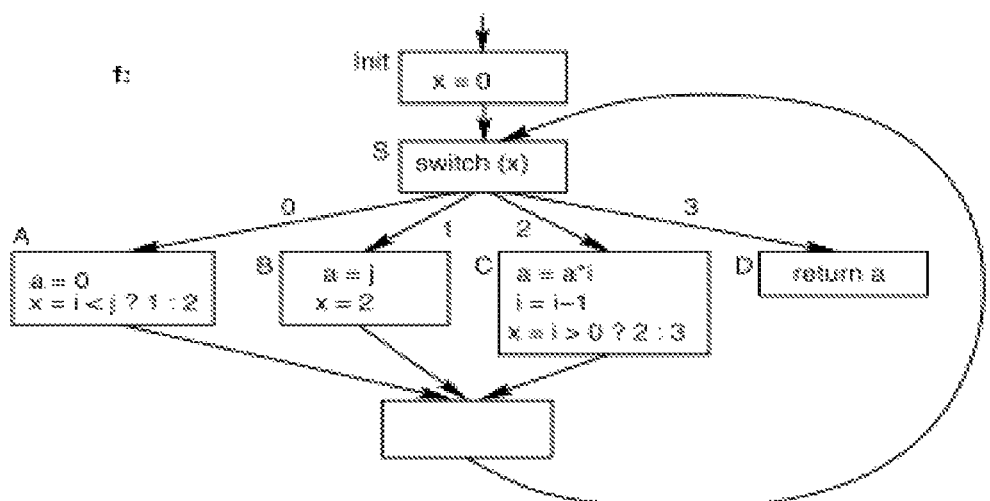
FIG. 2 illustrates a flattened CFG corresponding to the CFG in FIG. 1.
Figure 3:
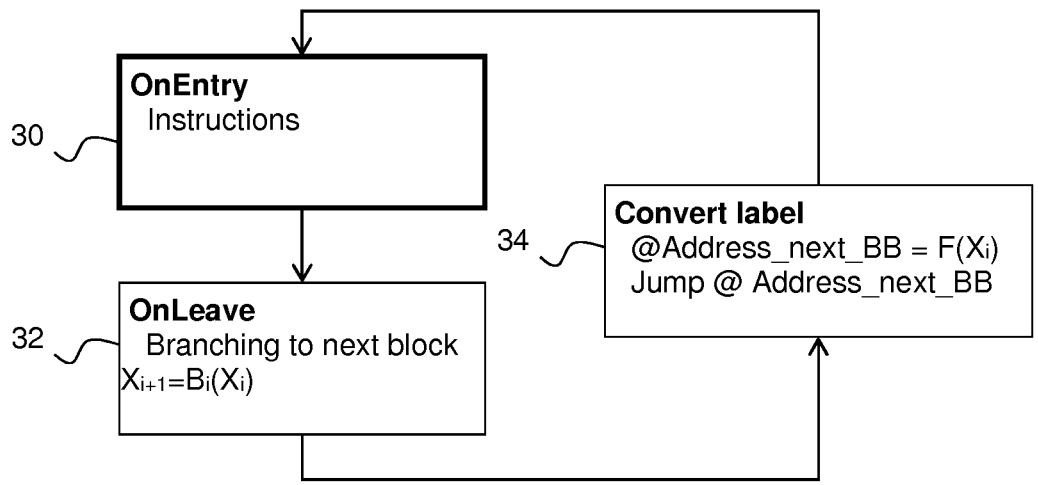
FIG. 3 illustrates a generic sequence diagram for a flattened CFG.
Figure 4:
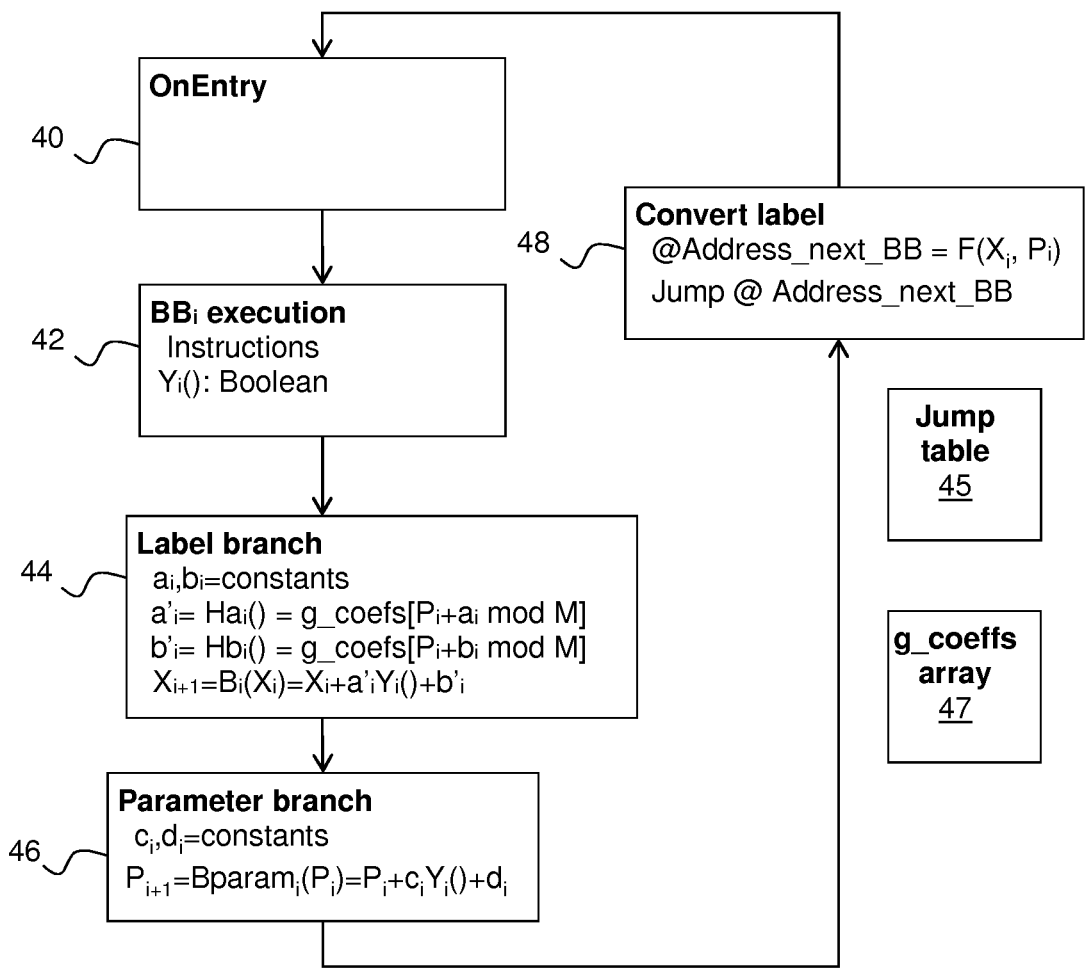
FIG. 4 illustrates a computer program with a flattened CFG.

During CFG flattening to protect a binary, a flattening tool inserts the following in the intermediate representation to obtain the flattened CFG, illustrated in FIG. 4 for one generic BB and a dispatcher:
  a global coefficient array, g_coeffs[ ];
  a jump table;
  a dispatcher basic block;
  a transition function $F(X_{i+1})$: $\{1 \ldots n\} \rightarrow N$, called by the dispatcher, that translates, using the jump table, the logical label $X_{i+1}$ to an address $PA_{i+1}$ of the BB to which execution will jump is going to jump;
  at least one lookup function $Ha_i( )$, $Hb_i( )$ ... in each $BB_i$ that retrieves coefficients $a'_i$, $b'_i$, ... from the global array preferably taking as input the parameter index $P_i$ and at least one constant $a_i$, $b_i$, ... in the basic block $BB_i$; the function can take further input such as the current label $X_i$;
  a first branch function $B_i( )$ inlined in each $BB_i$ that computes the next logical label $X_{i+1}$ depending on the current label $X_i$, coefficients returned by the lookup functions and at least one conditional statement $Y_i(\ )$; and a second branch function $Bparam_i(\ )$ inlined in each $BB_i$ that computes the next parameter index $P_{i+1}$, depending on the current index $P_i$ and the conditional statement $Y_i(\ )$.

As mentioned, the lookup functions $Ha_i(\ )$, $Hb_i(\ )$ can depend on further input such as the current label $X_i$, thus allowing a generalized lookup function such as $a'_i = Ha_i(g\_coefs, P_i, X_i, a_i, b_i \ldots)$. It is then possible to provide a more complex function such as for example $a'_i = g\_coef[P_i + a_i + X_i] XOR X_i * b_i$.

The lookup functions, the first branch functions and the second branch functions are advantageously different between at least some, preferably all of the basic blocks.

As mentioned, FIG. 4 illustrates a computer program with a flattened CFG, the program comprising a dispatcher 48 and a basic block comprising an entry part 40, an instruction part 42 comprising the original instructions of the BB, a first branch function part 44 and a second branch function part 46. FIG. 4 also illustrates a jump table 45 and a g_coeffs array 47. It will be understood that the program comprises a plurality of basic blocks, but that only one is illustrated for reasons of clarity.

During execution, a jump is made from the dispatcher 48 to the entry part 40 of the BB. Then the instruction part 42 is executed and the conditional statement $Y_i(\ )$ is evaluated, advantageously using one or more Boolean functions. Execution moves on to the first branch function part 44 preferably comprising at least one constant, in the example two constants $a_i$, $b_i$. The at least one constant is then used to obtain at least one derived value by looking up a value in the global coefficient array 47, using the parameter index Pi and at least one constant as input. In the present example, two derived values are calculated as $$a'_i = Ha_i(\ ) = g\_coefs[P_i + a_i \bmod M]$$

$$b'_i = Hb_i(\ ) = g\_coefs[P_i + b_i \bmod M]$$

and the derived values are then used as input to the first branch function $B_i(\ )$ to generate the next logical label $X_{i+1}$ as $$X_{i+1} = B_i(X_i) = X_i + a'_i Y_i(\ ) + b'_i.$$

Then the second branch function part 46 is executed in which the next parameter index $P_{i+1}$ is calculated using the second branch function $Bparam_i(\ )$ preferably using at least one constant taking as input the current parameter index $P_i$:

$$P_{i+1} = Bparam_i(P_i) = P_i + c_i Y_i(\ ) + d_i, \text{ where } c_i \text{ and } d_i \text{ are constants.}$$

Although not illustrated, the second branch function part 46 finishes by a jump to the dispatcher 48.

The dispatcher uses the logical label $X_{i+1}$ as input to the transition function $F(\ )$ that looks up a corresponding address in the jump table 45 and then jumps to the obtained address, which is the address of the next BB to execute.

In an advantageous embodiment (illustrated in the Figure), the transition function $F(\ )$ further depends on the index $P_i$. The jump table is then obfuscated with the index $P_i$ using any suitable obfuscation method such as, but not limited to, encryption of table cells with the index $P_i$ or use of the index $P_i$ as a seek offset in the table.

The skilled person will appreciate that FIG. 4 is merely an example and that various modifications may be made. For example, the constants can be defined anywhere within the BB as long as this is done before they are used, there can be a different number of constants used in the formulae, the formulae used to obtain the derived values may be different, the first branch function $B_i(\ )$ and the second branch function $Bparam_i(\ )$ may be different, and so on. In particular, the first branch function $B_i(\ )$ and the second branch function $Bparam_i(\ )$ can be from Z to Z or from Z to Z/nZ (e.g. modulo n).

Figure 5:
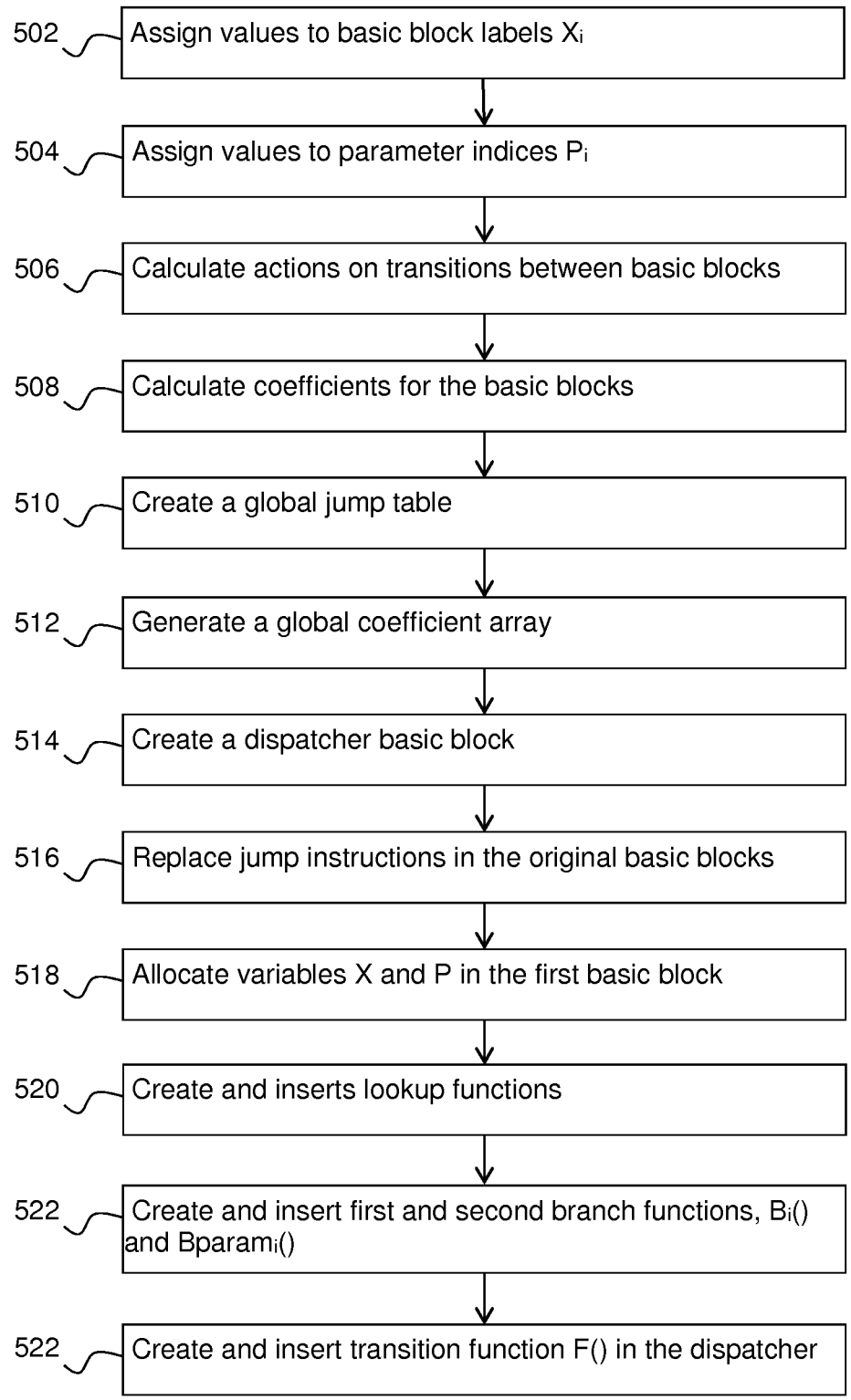
FIG. 5 illustrates a method for CFG flattening according to the present principles.
Figure 6:
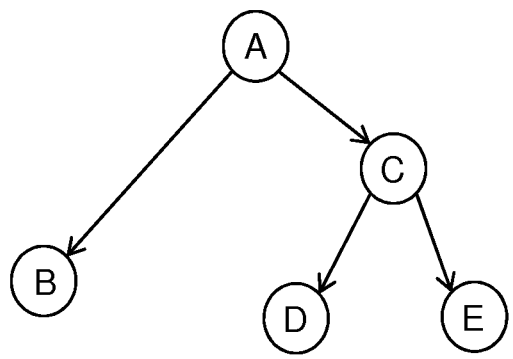
FIG. 6 illustrates an exemplary unflattened CFG.

FIG. 5 illustrates a method for CFG flattening according to the present principles. The method is advantageously performed by a CFG flattening device and takes as input a computer program with N basic blocks, where N is an integer greater than 1. The method can flatten the CFG for all the functions of the computer program or for a subset of these functions. An example for the unflattened CFG comprising basic blocks A-E, illustrated in FIG. 6, will be given for some steps.

In step 502, the label for each basic block is given a distinct value, preferably in $\{1 \ldots N\}$. This can be done by shuffling the basic blocks using the Fisher-Yates shuffle algorithm or the like.

$$BB_A: X_A = 4$$

$$BB_B: X_B = 1$$

$$BB_C: X_C = 2$$

$$BB_D: X_D = 3$$

$$BB_E: X_E = 5$$

In step 504, the parameter index $P_i$ for each basic block is given a value in $\{0 \ldots M-1\}$. As there is no uniqueness constraint on $P_i$, it is possible to pick random values.

In the example, the parameter indices will be given abstract values P0-P3 that in reality would correspond to integers.

$$BB_A: P_A = P2$$

$$BB_B: P_B = P3$$

$$BB_C: P_C = P1$$

$$BB_D: P_D = P3$$

$$BB_E: P_E = P2$$

In step 506, the actions upon transitions between the basic blocks are calculated, i.e. the changes for the labels X and the parameter indices $P_i$. In other words, this corresponds to the modifications made by the first branch function $B_i(\ )$ and the second branch function $Bparam_i(\ )$ In the example, the calculations for the parameter indices is performed modulo 4, since M=4 in the example.

$$BB_A \to BB_B: X_B = X_A - 3, P_B = P_A + 1 \bmod 4$$

$$BB_A \to BB_C: X_C = X_A - 2, P_C = P_A + 3 \bmod 4$$

$$BB_C \to BB_D: X_D = X_C + 1, P_D = P_C + 2 \bmod 4$$

$$BB_C \to BB_E: X_E = X_C + 3, P_E = P_C + 1 \bmod 4$$

In step 508, the coefficients for each basic block are calculated, as will be described in further detailed hereinafter.

In step 510, the global jump table is created. The global jump table associates, for each basic block, the label $X_i$ with the address of the basic block $BB_i$.

In step 512, the global coefficient array is generated. The global coefficient array comprises the constant coefficients used by the lookup functions that provide the derived values for the first branch functions $B_i(\ )$ and preferably also dummy values. It is advantageous to shuffle the values of the global coefficient array.

In step 514, the dispatcher basic block is created. As already mentioned, the dispatcher comprises instructions to look up an address in the jump table and to jump to this address.

In step 516, the Jump terminal instruction to another basic block is replaced by a jump to the dispatcher in each basic block of the original CFG.

In step 518, integer variables X and P are allocated in the stack of the function of the original CFG and they are respectively initialized to $X_0$ and $P_0$. To do this, four intermediate language instructions are added in the first basic block of the function. Two integer allocation instructions are inserted to declare variables X and P into the stack and two affectation instructions are inserted to initialize these variables respectively to $X_0$ and $P_0$.

In step 520, lookup functions are created and inserted.

In step 522, the first branch function $B_i(\ )$ and the second branch function $Bparam_i(\ )$ are created and inserted together with any local constants into the basic blocks before the Jump terminal instructions. As already mentioned, the first branch function $B_i(\ )$ uses derived values provided by the lookup functions.

In step 524, the transition function $F(\ )$ is created and inserted into the dispatcher.

As mentioned, the coefficients for the branch functions $B_i(\ )$ and $Bparam_i(\ )$ are calculated in step 508. In the example, these coefficients are $\{a'_i, b'_i\}$ and $\{c_i, d_i\}$. For each basic block $BB_i$, the CFG flattening device knows the current values of $X_i$ and $P_i$ as well as the values $X_{i+1}$ and $P_{i+1}$ of its successors. Determining the coefficients can thus be done by resolving the equations $X_{i+1}=B_i(X_i)$, $P_{i+1}=Bparam_i(P_i)$. The resolution of the equations are trivial as these functions are linear and invertible.

As an example, imagine that basic block $BB_3$ with label $X_i=3$ jumps to $BB_5$: $X_i=5$ for k>2, and to $BB_6$: $X_i=6$ otherwise. The conditional statement can be expressed by a Boolean function $Y_i(k)=1$ if k>2, 0 else. Then it is possible to write:

$$X_{i+1=}B_3(X_i) = X_i + Y_i(k) \times (5-3) + (1-Y_i(k)) \times (6-3)$$
$$= X_i + Y_i(k) \times 2 + (1-Y_i(k)) \times 3$$
$$= X_i + Y_i(k) \times (-1) + 3$$

which means that the coefficients of branch function $BB_3(\ )$ are $a'_i=-1$, $b'_i=3$.

In the same manner, the CFG flattening device solves $P_{i+1}=Bparam_i(Pi)$ to obtain coefficients $c_i,d_i$. The coefficients $c_i,d_i$ are inserted as local constants inside the basic block $BB_i$ and referenced by the second branch function $Bparam_i(\ )$.

The content of the global coefficient array can be determined by resolving the equations $a'_i=Ha_i(g\_coefs, P_i, X_i, a_i, b_i \ldots )$ and similar for $b'_i$. The resolution of the equations is trivial as these functions are linear and invertible. For example, for $a'_i=Ha_i(\ )=g\_coefs[P_i+a_i \bmod M]$, the coefficient $a'_i$, $b'_i$ are stored in the global coefficient array, in a random position relative to offset $P_i$. For example if $a'_i$, $b'_i$ are located at relative offset 1, 4 from $P_i$: $a'_i=g\_coefs[P_i+1]$, $b'_i=g\_coefs[P_i+4]$. The relative offsets (1,4) are inserted as local constants inside the basic block $BB_i$ and referenced by the first lookup function $Ha'_i(\ )$.

For a more complex lookup function, for example $a'_i=g\_coef[P_i+a_i+X_i]$XOR $X_i*b_i$, the contents of the global array can be computed as well; in this case, it gives $g\_coef[P_i+a_i+X_i]=a'_i$ XOR $X_i*b_i$.

The branch functions $B_i(\ )$ and $Bparam_i(\ )$ can be adapted for a basic block having 1 to K successors. For each successor $BB_j$ of $BB_i$, there is a conditional statement that expresses the condition to branch from $BB_i$ to $BB_j$, given some input. Let $Y_{ij}(\ )$ denote the boolean function in $BB_i$, $i\in\{1\ldots N\}$, $j\in\{1\ldots K\}$:

$$Y_{ij}(\text{input}) = 1 \text{ if (input)} == \text{value}_j$$
$$= 0 \text{ else.}$$

Then $X_{i+1}=B_i(X_i)=X_i+\Sigma_{j=1}^{K}(Y_{ij}(\text{input})*a'_{ij})$.

Figure 7:
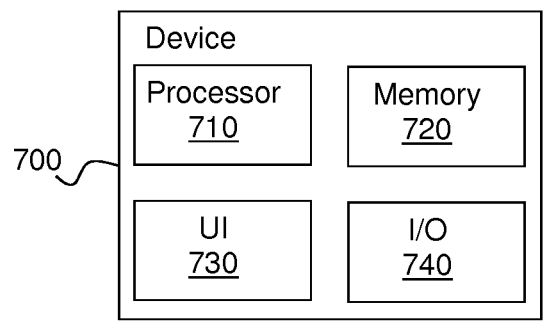
FIG. 7 illustrates an exemplary CFG flattening device.

FIG. 7 illustrates an exemplary CFG flattening device 700 in which the present method is implemented. The device 700 comprises at least one hardware processing unit ("processor") 710, memory 720, a user interface 730 for interacting with a user, and a communications interface 740 for communication with further devices over a connection such as the Internet. The skilled person will appreciate that the illustrated device is very simplified for reasons of clarity and that real devices in addition would comprise features such as power supplies and persistent storage.

The processor 710 is configured to obtain a computer program with an at least partly unflattened CFG, flatten the CFG of the computer program using the present principles (advantageously the method illustrated in FIG. 5), and output a computer program with an at least partly flattened CFG. The flattened computer program is advantageously stored on a non-transitory storage medium (not shown).

It will be appreciated that the flattening of the CFG according to the present principles can be made during compilation at the intermediate language level, but that it can also be made at source or binary level.

Moreover, the present principles can provide a generic and automatic solution that can work for any kind of CFG, whatever it looks like (for instance, with loop circuits, multiple basic block predecessors, multiple basic block successors, etc. . . . ).

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method for control flow graph flattening of a function of software code, the function comprising a plurality of basic blocks each having an address and at least one instruction, the method, performed by a processor of a device, comprising:
   inserting a jump table associating a label of each basic block with the address of the basic block;
   inserting a coefficient array comprising constant coefficients for each of the plurality of basic blocks;
   inserting a dispatcher basic block comprising instructions to look up an address in the jump table and to jump to the address;
   replacing a jump terminal instruction by a jump to the dispatcher basic block in each of the plurality of basic blocks;

inserting at least one lookup function in each of the plurality of basic blocks, each lookup function returning, depending on at least an index of the basic block, a derived value based on a constant coefficient from the coefficient array, each constant coefficient;

inserting a first branch function and a second branch function, wherein the first branch function calculates the label of a subsequent basic block based on at least the derived value and the label of the present basic block, and wherein the second branch function calculates the index of the subsequent basic block based on the index of the present basic block; and inserting a transition function into the dispatcher basic block, the transition function obtaining the address in the jump table based on at least the label of a subsequent basic block.

2. The method of claim 1, wherein dummy values are included in the coefficient array.

3. The method of claim 1, wherein the transition function obtains the address in the jump table based on also the index of the subsequent basic block.

4. The method of claim 1, further comprising giving a value to the label of each of the plurality of basic blocks.

5. The method of claim 1, further comprising giving a value to the index of each of the plurality of basic blocks.

6. The method of claim 1, further comprising calculating changes for the labels and the indices that will result from transitions between the plurality of basic blocks, the changes corresponding to modifications made to the labels by the first branch function and to the indices by the second branch function.

7. The method of claim 1, further comprising calculating coefficients for each of the plurality of basic blocks.

8. The method of claim 1, wherein the processor is configured to:
   obtain a computer program with an at least partly unflattened control flow graph;
   flatten the control flow graph in the computer program; and
   output the computer program with the at least partly unflattened control flow graph.

9. A device for control flow graph flattening of a function of software code, the function comprising a plurality of basic blocks each having an address and at least one instruction, the device comprising a hardware processor configured to:
   create a jump table associating a label of each basic block with the address of the basic block;
   create a coefficient array comprising constant coefficients for each of the plurality of basic blocks;
   create a dispatcher basic block comprising instructions to look up an address in the jump table and to jump to the address;
   replace a jump terminal instruction by a jump to the dispatcher basic block in each of the plurality of basic blocks;
   create and insert at least one lookup function in each of the plurality of basic blocks, each lookup function returning, depending on at least an index of the basic block, a derived value based on a constant coefficient from the coefficient array, each constant coefficient;
   create and insert a first branch function and a second branch function, the first branch function calculating the label of a subsequent basic block based on at least the derived value and the label of the present basic block, and the second branch function calculating the index of the subsequent basic block based on the index of the present basic block; and
   create and insert a transition function into the dispatcher basic block, the transition function obtaining the address in the jump table based on at least the label of a subsequent basic block; and
   an interface configured to output the function after control flow graph flattening.

10. The device of claim 9, wherein the processor is configured to include dummy values in the coefficient array.

11. The device of claim 9, wherein the processor is further configured to make the transition function obtain the address in the jump table based on also the index of the subsequent basic block.

12. The device of claim 9, wherein the processor is further configured to give a value to the label of each of the plurality of basic blocks.

13. The device of claim 9, wherein the processor is further configured to give a value to the index of each of the plurality of basic blocks.

14. The device of claim 9, wherein the processor is further configured to calculate changes for the labels and the indices that will result from transitions between the plurality of basic blocks, the changes corresponding to modifications made to the labels by the first branch function and to the indices by the second branch function.

15. The device of claim 9, wherein the hardware processor is configured to:
   obtain a computer program with an at least partly unflattened control flow graph;
   flatten the control flow graph in the computer program; and
   output the computer program with the at least partly unflattened control flow graph.

* * * * *